2,831,826

MIXTURES OF ACRYLIC NITRILE-ETHYLENIC CHLORIDE COPOLYMERS WITH ACRYLAMIDIC POLYMERS AND FIBERS THEREOF

Harry W. Coover, Jr., and Willis C. Wooten, Jr., Kingsport, Tenn., assignors to Eastman Kodak Company, Rochester, N. Y., a corporation of New Jersey No Drawing. Application December 30, 1954
Serial No. 478,886

9 Claims. (Cl. 260—32.8)

This invention relates to polymer mixtures and to fibers prepared therefrom, and is particularly concerned with certain mixtures of two polymers as hereinafter described which form synthetic fibers of excellent dyeability, high softening and sticking temperature, and excellent tenacity, extensibility, moisture absorption and the like.

Apart from the synthetic fibers prepared from linear condensation polymers or cellulose derivatives, the most widely made synthetic fibers are prepared from homopolymers copolymers of either acrylonitrile or a vinyl halide such as vinyl chloride or vinylidene chloride. These materials are also used in the manufacture of sheets, films and ribbons. Generally, the acrylonitrile polymers show excellent physical properties, such as high softening point, tensile strength, etc., but they suffer the serious disadvantage of being difficult to dye, difficult to dissolve in most organic solvents, and exhibiting poor moisture absorption characteristics. The vinyl halide polymers are also somewhat difficult to dye unless employed in copolymer form and, in many cases, exhibit an unduly low softening or sticking temperature.

Attempts have been made to increase the dyeability and moisture absorption of such acrylonitrile and vinyl halide polymers by forming an interpolymer of the acrylonitrile or vinyl halide monomer with another monomer which will form dyeable polymers. Such interpolymers, however, usually achieved dyeability and moisture absorption at a sacrifice of the other desirable physical properties and hence have not given a combination of the desired characteristics at the high level of each of the components individually. In the case of polyacrylonitrile particularly, attempts have been made to modify the properties by preparation of mixtures of the polyacrylonitrile with such materials as polyvinyl pyridines. In many cases, however, the mixtures had poor compatibility and exhibited longitudinal segmentation in fiber form. Furthermore, many of the mixtures suffered an undesirable loss in other valuable physical properties of the polyacrylonitrile.

One successful method of improving dyeability and moisture absorption without at the same time sacrificing the desirable properties of the acrylonitrile or vinyl halide has been to form graft polymers by polymerizing acrylonitrile or a vinyl halide monomer alone or together with another monomer in the presence of certain preformed homopolymers or copolymers of a readily dyeable polymer to form a unitary polymer structure wherein the monomer is graft polymerized with the preformed polymer molecule.

This invention is concerned with the discovery that, unexpectedly, certain specific mixtures of polymers as described hereinafter possess excellent fiber and film-forming characteristics, do not undergo segmentation or phase separation, can be heat stabilized to give products of high softening and sticking temperatures, exhibit excellent dye affinity and moisture absorption, and achieve these improved characteristics without sacrificing the other desirable properties such as tensile strength, extensibility and the like.

It is accordingly an object of this invention to provide mechanical mixtures of two specific kinds of polymers within a certain composition range, which mixtures do not possess the disadvantages inherent in many of the copolymers and mixtures known to the art and which possess in an unusual degree a combination of excellent dye affinity and moisture absorption with high softening or sticking temperature, excellent strength and high extensibility.

Another object of the invention is to provide mixtures of a fiber-forming polymer normally possessing low dye affinity and moisture absorption but possessing other desirable physical properties with a modifying polymer which greatly improves the dyeability and moisture absorption without reducing the other desirable properties of the first polymer, such as softening temperature, tenacity and extensibility to any objectionable degree.

Another object of the invention is to provide homopolymers or interpolymers of monomers from the group consisting of vinyl chloride, vinylidene chloride, acrylonitrile and methacrylonitrile admixed with a minor proportion of a modifying polymer which contains at least 50% of an acrylamidic monomer.

Another object of the invention is to provide new and improved synthetic fibers consisting of a mixture of polymers but free of the defects normally attendant to fibers prepared from polymeric mixtures.

Another object of the invention is to provide new polymers and fibers retaining the desirable properties of polyacrylonitrile but having, in addition, greatly enhanced dye affinity and moisture absorption.

Another object of the invention is to provide new polymers and fibers having the desirable properties of vinyl chloride or vinylidene chloride polymers substantially undiminished but having the poor properties of such polymers greatly improved.

Another object of the invention is to provide polymeric mixtures of especially good solubility characteristics, and preferably possessing excellent solubility in acetone at room temperature whereby synthetic fibers of unusual physical characteristics can be readily wet or dry spun from common organic solvent solutions and preferably from acetone dopes.

Other objects will be apparent from the description and claims which follow.

These and other objects are attained to an unusual degree by means of this invention wherein mixtures are prepared from (A) 70–95% by weight of a polymer containing, in combined form, from 0 to 100% by weight of chloride monomer from the group consisting of vinyl chloride and vinylidene chloride and conversely from 100 to 0% by weight of nitrile monomer from the group consisting of acrylonitrile and methacrylonitrile, with (B) 30–5% by weight of a second polymer containing, in combined form, from 50 to 100% by weight of an acrylamidic monomer of the formula

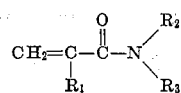

wherein $R_1$ is hydrogen or a methyl group, and $R_2$ and $R_3$ respectively are hydrogen or an alkyl group of 1–6 carbon atoms, and conversely from 50–0% by weight of one or more polymerizable monoethenoid monomers (i. e. monoolefinic monomers containing a single —CH=C< group and desirably a $CH_2$=C< group).

A number of modifiers have been used for preparing graft polymers with such nitrile or chloride monomers including the acrylamides, maleamides, fumaramides, itaconamides, citraconamides, maleamates, fumaramates, itaconamates, citraconamates, acrylates, and vinyl esters. For reasons which are not apparent, the acrylamidic monomers as defined hereinabove can be used in modifying the nitrilic or chloride polymers by merely forming mixtures of the polymers within the composition ranges defined herein without reducing the desirable properties thereof and without the disadvantages normally attendant to attempts to form polymeric mixtures. Ordinarily, a mixture of polymers suffers an undesirable lowering in softening temperature, but this does not occur with the mixtures embodying this invention. Futhermore, the second or modifying polymer would ordinarily be expected to impart enhanced dye affinity and moisture absorption only at an unduly large sacrifice of the other desirable properties, but this objectionable loss in properties does not take place in the mixtures herein defined, although the reason for this is not known since certain other modifiers which can be used interchangeably in graft polymerization do not form mixtures of the type herein disclosed with the advantageous combination of properties desired.

In practicing the invention, the first polymer can be a homopolymer of vinyl chloride, vinylidene chloride, acrylonitrile or methacrylonitrile, or it can be an interpolymer of any two or more of such monomers. Preferably, the interpolymers employed contain at least 5% by weight of chloride monomer and at least 5% by weight of nitrile monomer, with the two types forming the total polymer. Thus copolymers of 5–95% of vinyl chloride and/or vinylidene chloride with 95–5% by weight of acrylonitrile and/or methacrylonitrile are preferably employed rather than the homopolymers although the homopolymers are suitable as well as copolymers of vinyl chloride and vinylidene chloride or of acrylonitrile and methacrylonitrile. When the particular properties characteristic of polyacrylonitrile polymers are desired, the first polymer desirably consists of from 85–100% by weight of acrylonitrile. The preferred polymers contain 5–100% by weight of chloride monomer and 95–0% by weight of nitrile monomer. In certain other cases, the properties imparted by the chloride monomer are desirable, and particularly resistant to burning, in which case, the first polymer desirably contains 30–100% by weight of chloride monomer (which is intended to include either or both of vinyl chloride and vinylidene chloride).

Highly effective modification of dyeability and moisture absorption is obtained with amounts of the second or modifier polymer as low as 5% of the combined polymer weights. Such properties are increased with increasing amounts of the modifier polymer (i. e. the acrylamidic polymer) and amounts up to 30% of the combined polymer weight can be used with satisfactory results. The acrylamidic monomer or monomers can be the sole monomeric material employed in forming the modifier polymer or such polymer can be composed of as much as 50% by weight of one or more of other monoethylenic polymerizable monomers.

The acrylamidic monomer or monomers which forms at least 50% of the modifier polymer can be any of the materials of the formula

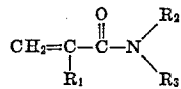

wherein $R_1$, $R_2$ and $R_3$ have the values given hereinabove, and such monomers include but are not limited to such materials as acrylamide, methacrylamide, N-methyl acrylamide, N,N-dimethyl acrylamide, N-ethyl acrylamide, N,N-diethyl acrylamide, N-isopropyl acrylamide, N-t-butyl acrylamide, N-methyl methacrylamide, N,N-dimethyl methacrylamide, N-ethyl methacrylamide, N,N-diethyl methacrylamide, N-isopropyl methacrylamide, N-cyclohexyl acrylamide, N-butyl methacrylamide, and similar acrylamidic monomers containing one or two straight or branched chain N-alkyl groups of 1–6 carbon atoms and including those wherein the N-alkyl groups are different such as N-methyl-N-ethyl acrylamide and the like.

The modifier polymer can be a homopolymer of any of these or similar acrylamidic monomers as well as interpolymers of two or more of such acrylamidic monomers in any proportions. Highly valuable modifier polymers for use in the mixtures embodying the invention are those wherein not more than 50% of the combined monomer is a non-acrylamidic monomer or monomers. Such other monomer or monomers can include any of the well known copolymerizable monoethenoid monomers which contain a single —CH=C< group, and the invention is not limited as to the nature of such other monomer or monomers except as otherwise specifically indicated. Thus, the monomers combined with the acrylamidic monomer to form the modifier polymer can include such materials as the maleamides, itaconamides, citraconamides, maleamates, citraconamates, itaconamates, fumaramates, fumaramides, acrylates, methacrylates, vinyl esters, isopropenyl esters, vinyl ketones, vinyl esters, vinyl pyridines, styrene or substituted styrenes, acrylonitrile or substituted acrylonitriles, polymerizable hydrocarbons, fumaronitrile, vinyl phthalimides, vinylic acids and similar well known monoethylenically unsaturated polymerizable monomers.

Typical monomers which are illustrative of those suitably employed include but are not limited to styrene, α-methyl styrene, p-acetamino styrene, α-acetoxystyrene, vinyl chloride, vinylidene chloride, maleamide, N-methyl maleamide, N-ethyl maleamide, N-n-butyl maleamide, N,N'-dimethyl maleamide, N,N'-methyl ethyl maleamide, N,N'-tetramethyl maleamide, vinyl acetate, vinyl propionate, vinyl butyrate, vinyl isobutyrate, fumaramide, N-methyl fumaramide, N-isopropyl fumaramide, N,N'-diethyl fumaramide, N,N'-di-n-butyl fumaramide, N,N'-tetraethyl fumaramide, itaconamide, N-methyl itaconamide, N-propyl itaconamide, N,N'-dimethyl itaconamide, citraconamide, N-methyl citraconamide, N-n-butyl citraconamide, N,N'-diethyl citraconamide, N,N'-tetramethyl citraconamide, methyl acrylate, ethyl acrylate, propyl acrylate, isopropyl acrylate, butyl acrylate, methyl maleamate, propyl maleamate, N-methyl methyl maleamate, N-methyl butyl maleamate, N-dibutyl methyl maleamate, methyl methacrylate, ethyl methacrylate, propyl methacrylate, n-butyl methacrylate, isopropyl methacrylate, methyl ethacrylate, ethyl ethacrylate, methyl fumaramate, ethyl fumaramate, propyl fumaramate, methyl N-methyl fumaramate, ethyl N-methyl fumaramate, n-butyl-N-dimethyl fumaramate, 2-vinyl pyridine, 5-vinyl pyridine, 2-methyl-5-vinyl pyridine, methyl itaconamate, butyl itaconamate, methyl N-methyl itaconamate, propyl N-methyl itaconamate, methyl N-dibutyl itaconamate, methyl citraconamate, ethyl citraconamate, propyl citraconamate, ethyl N-dimethyl citraconamate, methyl N-dibutyl citraconamate, n-butyl N-methyl citraconamate, acrylonitrile, methacrylonitrile, α-acetoxy acrylonitrile, fumaronitrile, ethyl vinyl ether, isopropyl vinyl ether, isopropenyl acetate, isopropenyl propionate, isopropenyl methyl ketone, ethyl isopropenyl ketone, methyl vinyl ketone, ethyl vinyl ketone, dimethyl maleate, diethyl maleate, diisopropyl maleate, dimethyl fumarate, diethyl fumarate, diisopropyl fumarate, acrylic acid, methacrylic acid, N-vinyl phthalimide, ethylene, isobutylene, and similar monoethenoid monomers.

The mixtures embodying the invention can be prepared in any desired manner. Thus, for example, the two polymers can be isolated and dried after preparation and then mixed in dry form, or they can be prepared in emulsion and the emulsions mixed before isolation of the polymers or any other method of obtaining the mixtures can be used. Either or both of the polymers can be prepared either batchwise or continuously, and the mixing can be either in batch or continuously.

The preparation of the polymers can be effected in accordance with usual polymerization practices in dispersion (including either solution or emulsion) in aqueous medium or in a mixture of water and a water-miscible solvent such as acetone, or in an organic solvent such as acetone, an alcohol, an aromatic hydrocarbon such as benzene or similar solvent. The temperature at which the polymerization is effected is not critical and usually is within the range of 15–75° C. The polymerization, in accordance with usual practice, is desirably effected in the presence of a polymerization catalyst and can be accelerated by heat or actinic light. The peroxy catalysts such as the alkali metal persulfates, perborates and percarbonates, peroxides such as benzoyl peroxide, oleoyl peroxide, lauryl peroxide, t-butyl hydroperoxide and the like are preferably employed, although such other materials as the azines, ketazines, etc can be used. If desired, an activator such as an alkali metal bisulfite can also be used, preferably in combination with a peroxy catalyst in a redox system. Other polymerization adjuvants can also be employed such as the chain regulators as typified by lauryl mercaptan, to-dodecyl mercaptan, decyl mercaptan, hexyl mercaptan, and the like. In the case of the chloride and nitrile polymers particularly, it is usually desirable to employ an emulsifying agent in the polymerization. Typical emulsifying agents which are suitable include the alkali metal salts of certain alkyl acid sulfates such as sodium lauryl sulfate, alkali metal salts of aromatic sulfonic acids such as sodium isobutylnaphthalenesulfonate, alkali metal or amine addition salts of sulfosuccinic acid esters, alkali metal salts of fatty acids containing from 12 to 20 carbon atoms, sulfonated fatty acid amides, alkali metal salts of alkane sulfonic acids, sulfonated ethers, etc. The amounts and proportions of such catalysts, activators, emulsifying agents and other adjuvants can be varied in accordance with usual polymerization practices depending upon the nature, proportions and concentrations of monomers, amount and kind of diluent, polymerization conditions and similar variable factors.

Thus, the predominant polymer and/or the modifier polymer can each be prepared in batchwise fashion and the batches mixed before or after isolation of the polymers therefrom. In the preferred practice, at least the predominant polymer is prepared by a continuous equilibrium process for enhanced solubility. In effecting the polymerization either batchwise or continuously, the polymerization can be stopped at any degree of conversion desired, as, for example, from 50–100% conversion, although high conversion efficiencies such as 80–100% and preferably substantially complete conversions of 90–100% are desirable from the standpoint of commercial production. Low conversion enhance the solubility of the polymers, but enhanced solubility is more desirably obtained by continuous processing. In the continuous equilibrium process, all of the components of the polymerization mixture including monomer or monomers, polymerization catalyst and polymerization medium are brought together continuously and progressively at controlled rates and in predetermined proportions, the polymerization of each increment of mixture is carried out under substantially identical polymerization conditions, such as constant temperature, and polymer emulsion or slurry is continuously and progressively withdrawn from the polymerization zone at a rate corresponding to the total rate of addition of the components of the mixture. In this way, an extremely uniform polymeric product is obtained which exhibits greatly enhanced solubility in all solvents and for the entire range of polymer compositions. The continuous equilibrium process is of particular utility in forming the chloride and nitrile polymers and particularly those prepared from 5–95% by weight of vinyl chloride and/or vinylidene chloride and 95–5% by weight of acrylonitrile and/or methacrylonitrile. The resulting polymers show greatly improved solubility in such solvents as dimethyl formamide, dimethyl acetamide, γ-butyrolactone, ethylene carbonate, ethylene carbamate, N-methyl-2-pyrrolidone, N,N-dimethylmethoxy acetamide, dimethyl cyanamide, N,N-dimethyl cyanoacetamide, glycolonitrile, malononitrile, ethylene cyanohydrin, dimethyl sulfoxide, N-formyl pyrrolidone, N-formyl morpholine, N,N-tetramethylmethane phosphonamide and similar solvents which can also be used for preparing solutions and spinning dopes of the polymer mixtures wherein the polymers were prepared by batch processes.

In the case of copolymers of 25–65% by weight of vinyl or vinylidene chloride with 75–35% by weight of acrylonitrile or of 0–25% by weight of vinyl or vinylidene chloride with 100–75% by weight of methacrylonitrile, the continuous equilibrium process yields polymers which are readily acetone-soluble at room temperature whereby fiber-spinning or film casting dopes of the mixture embodying the invention can be prepared at solids concentrations of as much as 15–20% or more.

Because of the enhanced solubility characteristics, the nitrile and chloride polymers (i. e. the predominant polymer) are desirably prepared by the continuous equilibrium process and a dispersion of the modifier polymer, prepared either batchwise or continuously, is continuously mixed with the emulsion of the predominant polymer in the desired proportions as it is withdrawn from the polymerizing zone. In this way, the mixture can be formed in dispersion and the mixture isolated in its final form for use in spinning, casting or extruding. Although this method is conveniently employed from the standpoint of plant practice, the mixtures prepared by dry mixing the two polymers in granular form are of equal utility in making fibers, films, sheets, etc.

The polymer mixtures of the invention can be spun into synthetic fibers by any of the usual methods, including either wet or dry spinning. One outstanding advantage of these polymer mixtures is that they can be heat stabilized to give fibers having softening and sticking temperatures above 150° C., and usually of the order of 190–200° C. or higher. The fibers shown no objectionable tendency toward segmentation and are characterized by high tenacity and extensibility, good moisture absorption and excellent dye affinity.

The polymer mixtures can also be used for casting or extruding into films or sheets, which like the fibers, can be drafted and relaxed and heat stabilized in accordance with usual practice. The films thus prepared find utility in a variety of applications including use as photographic film base for carrying silver halide emulsions in either black-and-white or color photographic film.

The invention is illustrated by the following examples of typical embodiments thereof, it being understood that the examples are included merely to illustrate the invention and not to limit its scope unless otherwise specifically indicated.

*Example 1*

An acrylonitrile-vinylidene chloride copolymer was prepared by a continuous steady-state process by continuously and progressively introducing into a reactor incremental portions of components at controlled rates such that the polymerization mixture was continuously formed from 1 part by weight of acrylonitrile, 1 part by weight of vinylidene chloride, 1 part by weight of a 1% aqueous solution of potassium persulfate and 12 parts by weight of a solution of 1 part by weight of sodium octyl sulfate and 0.1 part by weight of potassium metabisulfite in 102 parts by weight of water. The polymerization mixture was agitated vigorously at a temperature maintained constant at 25° C. The addition rate was chosen so that each increment of mixture remained in the reactor for a contact time of 6 hours, at which time a conversion to polymer of 90% had been effected. The resultant polymer emulsion was continuously and progressively withdrawn from the reaction at a rate equal to the total rate of addition of reaction components whereby the composition of the reaction mixture remained substantially unchanged throughout the polymerization, which can be continued indefinitely. As the copolymer emulsion was withdrawn from the reactor, a 90:10 copolymer of N-isopropyl acrylamide and 2-methyl-5-vinyl pyridine, in solution, was continuously metered directly into the output of the reactor to give the desired composition mixture within the range of 70–95% by weight of acrylonitrile-vinylidene chloride copolymer and 30–5% by weight of the modifier polymer. The resulting polymer mixtures embodying the invention, after being isolated in accordance with usual practice, were soluble in acetone at room temperature to give spinning dopes from which fibers were spun having tenacities above 2 g. per denier, extensibilities above 15%, and softening temperatures of the order of 190–200° C. The fibers had excellent dye affinity, particularly for acetate dyes, and could be readily dyed to dark shades without use of superatmospheric pressures or dyeing assistants. The dyed fibers exhibited an unusual degree of light fastness and stability. Fabrics prepared from such fibers have an excellent hand, and show good resistance to flame propagation.

Example 2

Other modifier polymers give equally good results. Thus, acrylonitrile, vinylidene chloride, a 1% aqueous solution of potassium persulfate, and a solution of 1 part by weight of sodium octyl sulfate and 0.1 part by weight of potassium metabisulfite were continuously and progressively admixed, polymerized and withdrawn as in the preceding example. As the resultant emulsion of acrylonitrile-vinylidene chloride copolymer was being removed from the reactor, an aqueous emulsion (5% solids) of a 90:10 copolymer of N-tert. butyl acrylamide and 2-methyl-5-vinyl pyridine was metered directly into the output at such a rate that 30 parts of the acrylamide copolymer was mixed with 70 parts of the acrylonitrile-vinylidene chloride copolymer. The isolated mixtures of polymers was soluble in acetone and could be spun into fibers having high tenacities and extensibilities and excellent affinity for most classes of dyes.

Example 3

Similarly improved results are obtained with other copolymers as the predominant polymer and with homopolymeric modifiers. Thus, acrylonitrile (A), vinyl chloride (B), a 1% aqueous solution of potassium persulfate (C), and a solution (D) of 1 part by weight of sodium octyl sulfate and 0.1 part by weight of potassium metabisulfite in 102 parts of water were continuously and progressively added in a relative ratio, in parts by weight, of 0.6 A : 1.4 B : 1.0 C : 12.0 D. The addition rate was selected to give a contact time of 24 hours, at which time a 90% conversion to polymer was obtained. The polymerization mixture was agitated vigorously and maintained at a constant temperature of 25° throughout the polymerization, during which time the components were continuously added and polymer emulsion was continuously withdrawn at equal rates. An aqueous solution of an N-isopropyl acrylamide homopolymer was metered directly into the polymer emulsion being withdrawn to give a mixture of 30 parts by weight of the homopolymer and 70 parts by weight of the copolymer. The isolated mixture of polymers was soluble in acetone and formed fibers of high tenacity and extensibility and excellent affinity for most classes of dyes.

Example 4

Methacrylonitrile was substituted for acrylonitrile in the process described in Example 1, using sodium alkyl sulfosuccinate emulsifier (Aerosol OT). The polymeric mixture obtained gave a smooth gave a smooth acetone dope from which fibers were spun with tenacities above 2 g. per denier and extensibilities above 15%.

Example 5

Excellent polymer mixtures are obtained when the predominant polymer consists entirely of polymerized chloride monomer. Thus continuous equilibrium polymerization was effected in a polymerization mixture of 1.2 parts by weight of vinyl chloride, 0.8 parts by weight of vinylidene chloride, 1.0 parts by weight of a 1% aqueous solution of potassium persulfate, and 12.0 parts by weight of a solution of 1 part by weight of sodium octyl sulfate and 0.1 part by weight of potassium metabisulfite in 102 parts of water. The process was effected at 25° C. with a contact time of 24 hours and conversions of 90%. The copolymer emulsion was continuously withdrawn as described and the copolymer was isolated. A dry mixture was prepared of 85 parts by weight of the isolated copolymer and 15 parts by weight of a 50:50 copolymer of N-isopropyl acrylamide and N-tert. butyl acrylamide. This mixture gave a smooth dope in acetone, and fibers spun therefrom, after drafting, relaxing and stabilization, had tenacities of 2.8 g. per denier, extensibilities of 30% and high affinity for most classes of dyes.

Example 6

Using the continuous equilibrium process, 1.0 part by weight of acrylonitrile, 1.0 part by weight of vinylidene chloride, 1.0 part by weight of a 1% aqueous solution of potassium persulfate and 12.0 parts by weight of a solution of 1 part by weight of sodium octyl sulfate and 0.1 part by weight of potassium metabisulfite in 100 parts of water were progressively admixed and polymerized at 25° C. with a contact time of about 6 hours and a conversion to polymer of about 90%. The polymer, removed continuously in emulsion, was then isolated and 70 parts by weight of the isolated polymer was mixed with 30 parts by weight of a 90:10 copolymer of N-tert. butyl acrylamide and 2-methyl-5-vinyl pyridine. The resulting mixture gave a smooth dope in acetone form which excellent fibers were spun.

Example 7

A mixture was prepared from 85 parts of a granulated acetone-soluble copolymer of 45 parts of vinylidene chloride and 55 parts of acrylonitrile with 15 parts of poly-N-isopropyl acrylamide. The resulting mixture was soluble in acetone and spun into fibers which softened at 200° C. and had excellent affinity for acetate dyes.

Example 8

Ninety-five parts of a copolymer of 95 parts of vinyl chloride with 5 parts of methacrylonitrile was mixed mechanically with 5 parts of poly-N-tert. butyl acrylate. This mixture was extruded into tough, flexible films having softening points of about 130° C.

Example 9

Seventy parts of a copolymer of 85 parts of vinyl chloride and 15 parts of vinylidene chloride was mixed mechanically with 30 parts of a copolymer of 90 parts of N-tert. butyl acrylamide and 10 parts of 2-vinyl pyridine. This mixture was melt spun into fibers having an excellent affinity for acid wool dyes.

Example 10

A mechanical mixture of 80 parts of polyvinyl chloride and 20 parts of a copolymer of 70 parts of N-isopropyl acrylamide and 30 parts of 2-methyl-5-vinyl pyridine was dissolved in cyclo-hexanone. Fibers spun therefrom had an excellent affinity for acid wool dyes.

Example 11

A mechanical mixture of 75 parts of a 30:70 vinyl chloride-acrylonitrile copolymer and 25 parts of a 90:10 N-isopropyl acrylamide-dimethylaminoethyl acrylate copolymer was dissolved in acetone. Fibers spun therefrom had excellent affinity for acid dyes.

Example 12

A mixture was prepared from 85 parts of a 30:70 vinylidene chloride-methacrylonitrile copolymer and 15 parts of a 70:30 N-isopropyl acrylamide-N-methyl methacrylamide copolymer. The mixture was dissolved in cyclohexanone and cast into films having excellent dye take-up.

Example 13

Polyvinyl chloride (98 parts) was mechanically mixed with 2 parts of poly-N-isopropyl acrylamide. A plastic extruded therefrom had a tensile strength of 10,000 p. s. i.

Similarly good results are obtained with other polymeric mixtures within the ranges herein defined. The mixtures can be compounded with fillers, plasticizers and other well known compounding ingredients if desired.

Thus, by means of this invention, a highly useful class of polymer mixtures is provided which can be readily prepared and which do not suffer the disadvantages inherent in many polymeric mixtures. The individual polymers can be prepared by any of the well known polymerization techniques, although continuous process polymers are preferred for fiber applications because of their enhanced solubility characteristics. Since the mixtures can be prepared from polymers prepared in any of a number of ways, and since the polymers can be mixed either in solution or emulsion or in dry form, the invention can be readily practiced with a variety of equipment.

The invention has been described in detail with reference to certain embodiments, but variations and modifications can be effected within the spirit and scope of the invention as described hereinabove and defined in the appended claims.

We claim:

1. A fiber-forming, flame resistant, acetone soluble mixture of (A) 70–95% by weight of a copolymer of from 30 to 65% by weight of vinylidene chloride and 70 to 35% by weight of acrylonitrile, and (B) 30–5% by weight of a second polymer from the group consisting of (1) homopolymers of acrylamidic monomers of the formula

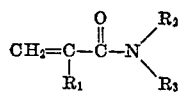

wherein $R_1$ is selected from the group consisting of hydrogen and methyl, and $R_2$ and $R_3$ are selected from the group consisting of hydrogen and alkyl groups of 1–6 carbon atoms, (2) copolymers consisting of at least two of said acrylamidic monomers, and (3) copolymers consisting of at least 50% by weight of at least one of said acrylamidic monomers and not more than 50% by weight of a polymerizable monovinyl pyridine monomer.

2. A synthetic fiber of a mixture of polymers as defined in claim 1.

3. An acetone solution of a mixture of polymers as defined in claim 1.

4. A fiber-forming, flame resistant, acetone soluble mixture of (A) 70–95% of a copolymer of from 30 to 65% by weight of vinylidene chloride and 70 to 35% by weight of acrylonitrile, and (B) 30–5% by weight of a homopolymer of an N-alkyl acrylamide wherein the alkyl group contains 1–6 carbon atoms.

5. A fiber-forming, flame resistant, acetone soluble mixture of (A) 70–95% of a copolymer of from 30 to 65% by weight of vinylidene chloride and 70 to 35% by weight of acrylonitrile, and (B) 30–5% by weight of a copolymer of an N-alkyl acrylamide and an N-alkyl methacrylamide wherein the alkyl groups each contain 1–6 carbon atoms.

6. A fiber-forming, flame resistant, acetone soluble mixture of (A) 70–95% of a copolymer of from 30 to 65% by weight of vinylidene chloride and from 70 to 35% by weight of acrylonitrile, and (B) 30–5% of a copolymer consisting of at least 50% by weight of an N-alkyl acrylamide and not more than 50% by weight of a polymerizable monovinyl pyridine monomer.

7. A fiber-forming, flame resistant, acetone soluble mixture of (A) 70–95% of a copolymer of 30–65% by weight of vinylidene chloride and 70–35% by weight of acrylonitrile, and (B) 30–5% of poly-N-isopropylacrylamide.

8. A fiber-forming, flame resistant, acetone soluble mixture of (A) 70–95% of a copolymer of 30–65% by weight of vinylidene chloride and 70–35% by weight of acrylonitrile, and (B) 30–5% of a copolymer consisting of at least 50% by weight of N-isopropylacrylamide and not more than 50% by weight of 2-methyl-5-vinyl pyridine.

9. A fiber-forming, flame resistant, acetone soluble mixture of (A) 70–95% of a copolymer of 30–65% by weight of vinylidene chloride and 70–35% by weight of acrylonitrile, and (B) 30–5% of a copolymer consisting of at least 50% by weight of N-tert. butyl acrylamide and not more than 50% by weight of 2-methyl-5-vinyl pyridine.

References Cited in the file of this patent

UNITED STATES PATENTS

| | | |
|---|---|---|
| 2,133,257 | Strain | Oct. 11, 1938 |
| 2,620,324 | Coover et al. | Dec. 2, 1952 |
| 2,646,417 | Jennings | July 21, 1953 |
| 2,688,008 | Chaney | Aug. 31, 1954 |

FOREIGN PATENTS

| | | |
|---|---|---|
| 644,022 | Great Britain | Oct. 4, 1950 |

OTHER REFERENCES

Dewar: "Electronic Theory of Organic Chemistry" (Oxford, 1949), Oxford University Press, pages 8–11.

Pauling: "The Nature of the Chemical Bond" (Ithaca, 1948), Cornell University Press, 2nd edition, pages 217–218.